United States Patent
Nammi

(10) Patent No.: US 8,670,343 B2
(45) Date of Patent: Mar. 11, 2014

(54) METHOD AND APPARATUS FOR CONFIGURING VARIABLE CQI REPORTING PERIOD IN A WIRELESS COMMUNICATION SYSTEM

(75) Inventor: Sairamesh Nammi, Stockholm (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 203 days.

(21) Appl. No.: 13/157,030

(22) Filed: Jun. 9, 2011

(65) Prior Publication Data

US 2012/0314588 A1   Dec. 13, 2012

(51) Int. Cl.
*H04W 24/00*   (2009.01)

(52) U.S. Cl.
USPC .......................................... 370/252

(58) Field of Classification Search
USPC ............... 370/254–430; 709/201–213
See application file for complete search history.

(56) References Cited

U.S. PATENT DOCUMENTS

| | | | |
|---|---|---|---|
| 2004/0022213 A1* | 2/2004 | Choi et al. | 370/332 |
| 2012/0008522 A1* | 1/2012 | Ng | 370/252 |
| 2012/0034917 A1* | 2/2012 | Kazmi | 455/434 |
| 2012/0082128 A1* | 4/2012 | Kent et al. | 370/330 |

* cited by examiner

*Primary Examiner* — Phirin Sam
*Assistant Examiner* — Debebe Asefa

(57) ABSTRACT

A system and method for configuring a variable Channel Quality Information (CQI) reporting period based on a User Equipment's (UE) Doppler frequency or speed. Mobile users are divided into three Doppler frequency regions based on their speed—for example, low, medium, and high Doppler users—and are assigned the CQI reporting periods accordingly by the base station. The users in the low and high Doppler regions (i.e., UEs with low and high speeds) receive a high value for the CQI reporting period, whereas—the users in the medium Doppler region (i.e., UEs with medium speeds) receive a low value for the CQI reporting period. The UE speed-specific CQI reporting period improves the uplink capacity by adaptively controlling a UE's CQI-related uplink transmissions, without compromising on the downlink capacity/throughput.

20 Claims, 4 Drawing Sheets

METHOD AND APPARATUS FOR CONFIGURING VARIABLE CQI REPORTING PERIOD IN A WIRELESS COMMUNICATION SYSTEM

CROSS-REFERENCE TO RELATED APPLICATIONS

NOT APPLICABLE

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND

The present invention relates to monitoring of radio channel quality in wireless networks. More particularly, and not by way of limitation, the present invention is directed to a method and apparatus to support variable Channel Quality Information (CQI) reporting period in uplink transmissions in cellular wireless networks.

With ever-increasing demand for wireless communication and broadband services, there is an ongoing evolution of Third Generation (3G) and Fourth Generation (4G) cellular networks such as High Speed Packet Access (HSPA), Evolution-Data Optimized (EV-DO), Long Term Evolution (LTE), Worldwide Interoperability for Microwave Access (WiMAX), and the like to support ever-increasing performance with regard to capacity, peak bit rates, and coverage. Operators deploying these networks are continuously facing the need to more accurately "predict" the quality of the radio channel between two transceivers operating in their networks. A mobile communication environment such as the Third Generation Partnership Project's (3GPP) LTE network, the Evolved Universal Terrestrial Radio Access (EUTRA), or the Evolved Universal Terrestrial Radio Access Network (E-UTRAN) air interface for LTE may require a base station to allocate resource blocks to a User Equipment (UE) where the resource blocks are generated by dividing the system bandwidth in the frequency domain. In such a mobile communication environment, the UE has to periodically feed back the Channel Quality Information (CQI) with respect to each frequency band via uplink signaling to the base station so as to enable the base station to more accurately "predict" channel quality for further downlink transmissions. The CQI feedback from the UE may indicate a combination of modulation scheme and channel coding rate that the base station should use to ensure that the block error probability experienced at the UE will not exceed ten percent.

In a wireless communication system employing Adaptive Modulation and Coding (AMC) in the downlink (for example, the LTE), CQI from the UEs is needed at the base station (e.g., an evolved Node-B (eNodeB or eNB)) to more accurately schedule the users for downlink transmissions, as mentioned above. Configuring the CQI reporting period is a complex problem because what is considered to be an "adequate" amount of information in the frequency direction and in the time direction in the CQI report may vary depending on the channel status and the moving speed of the UE. If the reporting period is very small, the quality of the CQI received from the UE is very good because of frequent delivery of CQI reports to the base station. In that case, the base station can more accurately keep track of the channel condition. However, a drawback of such frequent reporting is that it requires higher signaling from the UE, thereby reducing uplink throughput or capacity because more uplink frequency resources will be taken up for CQI reporting as opposed to carrying other user data. On the other hand, if the reporting period is fixed to a high value, then downlink throughput may be reduced dramatically for some channels due to the outdated CQI because reporting interval may be so long between two successive CQI's that channel quality information in one or more of such CQI's may become outdated by the time they are received at the base station, thereby requiring more retransmissions from the base station and, hence, reduced downlink throughput.

It is a common practice to set the CQI reporting interval to a fixed value. For example, in LTE, this value is set to either 5 ms or 10 ms depending on an operator's network implementation, even though there is no fixed rule in the current 3GPP standard regarding setting up of this value. Fixing the reporting period to a particular value for all the radio channels does not use the benefits of AMC in LTE, which allows variable or adaptive selection of coding bit rate (for Quadrature Phase Shift Keying (QPSK) modulation) depending on channel condition. In other words, the benefit of AMC (i.e., higher throughput through variable selection of coding bit rate) can still be achieved without rigidly fixing the CQI reporting interval to a single value, as is currently done in LTE network implementations.

SUMMARY

As discussed above, current LTE implementations rigidly set the CQI reporting interval to a fixed value (5 ms or 10 ms), which is not necessary to realize the benefit of multiuser diversity gain (or optimum throughput) from AMC. Furthermore, as mentioned before, such fixed CQI reporting value is not mandated in the current 3GPP standard; rather, the standard provides flexibility as to selection of such values. Also, a fixed CQI reporting value fails to more effectively take into account dynamic changes to a channel condition due to the relative motion between a transmitter and a receiver (known as the "Doppler effect")—i.e., the relative motion between the UE and the base station.

It is therefore desirable to devise a methodology that exploits the flexibility in the current 3GPP standard as to the selection of a value of the CQI reporting period and also takes into account a UE's Doppler frequency (i.e., the speed of the UE relative to the base station) to configure its CQI reporting period.

The present invention provides a solution to the above-mentioned problem of lack of utilization of flexibility in the current 3GPP standard as to fixing a value for a UE's CQI reporting period. An embodiment of the present invention provides for a variable CQI reporting period based on a UE's Doppler frequency or speed. Users are divided into different categories based on their speed—for example, low, medium, and high Doppler users—and are assigned the CQI reporting periods accordingly by the base station. The users in the low and high Doppler regions (i.e., UEs with low and high speeds) receive a high value for the CQI reporting period, whereas the users in the medium Doppler region (i.e., UEs with medium speeds) receive a low value for the CQI reporting period.

In one embodiment, the present invention is directed to a method of determining a Channel Quality Information (CQI)

reporting period of a User Equipment (UE) that is in wireless communication with a processor via a wireless network associated therewith. The method comprises the steps of: using the processor, determining a Doppler frequency region of the UE; and, using the processor, configuring the CQI reporting period of the UE based on the determination of the Doppler frequency region of the UE. The Doppler frequency region of the UE includes one of the following: a low Doppler frequency region when the speed of the UE is below a first predetermined threshold, a high Doppler frequency region when the speed of the UE is at or above a second predetermined threshold, and a medium Doppler frequency region when the speed of the UE is at or above the first predetermined threshold, but below the second predetermined threshold. According to the method, the CQI reporting period is configured to one of the following values: a first predetermined value when the Doppler frequency region of the UE is either the low Doppler frequency region or the high Doppler frequency region, and a second predetermined value when the Doppler frequency region of the UE is the medium Doppler frequency region, wherein the second predetermined value is lower than the first predetermined value.

In another embodiment, the present invention is directed to a method of setting a CQI reporting period of a UE that is in wireless communication with a processor via a wireless network associated therewith. The method comprises the steps of: using the processor, assigning a Doppler frequency region to the UE based on the speed of the UE estimated by the processor; and, using the processor, setting the CQI reporting period of the UE based on the assigned Doppler frequency region to the UE. The Doppler frequency region of the UE includes one of the following: a low Doppler frequency region when the estimated speed of the UE is below a first predetermined threshold, a high Doppler frequency region when the estimated speed of the UE is at or above a second predetermined threshold, and a medium Doppler frequency region when the estimated speed of the UE is at the first predetermined threshold or between the first and the second predetermined thresholds. In the method, the CQI reporting period is set to one of the following values: a first predetermined value when the Doppler frequency region of the UE is either the low Doppler frequency region or the high Doppler frequency region, and a second predetermined value when the Doppler frequency region of the UE is the medium Doppler frequency region, wherein the second predetermined value is lower than the first predetermined value.

In a further embodiment, the present invention is directed to a mobile communication node that is in wireless communication with a UE via a wireless network associated with the UE. The mobile communication node is configured to determine a Doppler frequency region of the UE, wherein the Doppler frequency region of the UE includes one of the following: a low Doppler frequency region when the estimated Doppler frequency of the UE is below a first predetermined threshold, a high Doppler frequency region when the estimated Doppler frequency of the UE is at or above a second predetermined threshold, and a medium Doppler frequency region when the estimated Doppler frequency of the UE is at or above the first predetermined threshold, but below the second predetermined threshold. The mobile communication node is also configured to set a CQI reporting period of the UE to one of the following values: a first predetermined value when the Doppler frequency region of the UE is either the low Doppler frequency region or the high Doppler frequency region, and a second predetermined value when the Doppler frequency region of the UE is the medium Doppler frequency region, wherein the second predetermined value is lower than the first predetermined value.

In another embodiment, the present invention is directed to a system that comprises a mobile communication node; and a mobile handset, wherein the mobile communication node is in wireless communication with the mobile handset via a wireless network associated with the mobile handset. The mobile communication node is configured to determine a Doppler frequency region of the mobile handset, wherein the Doppler frequency region of the mobile handset includes one of the following: a low Doppler frequency region when the speed of the mobile handset is below a first predetermined threshold, a high Doppler frequency region when the speed of the mobile handset is at or above a second predetermined threshold, and a medium Doppler frequency region when the speed of the mobile handset is at or above the first predetermined threshold, but below the second predetermined threshold. The mobile communication node is also configured to set a CQI reporting period of the mobile handset to one of the following values: a first predetermined value when the Doppler frequency region of the mobile handset is either the low Doppler frequency region or the high Doppler frequency region, and a second predetermined value when the Doppler frequency region of the mobile handset is the medium Doppler frequency region, wherein the second predetermined value is lower than the first predetermined value. The mobile communication node is further configured to send the value of the CQI reporting period to the mobile handset. The mobile handset is configured to use the value of the CQI reporting period received from the mobile communication node when sending a CQI report to the mobile communication node.

The present invention thus allows a base station to specify a CQI reporting period of a UE based on the UE's speed (Doppler frequency). In case of LTE, this approach to variable CQI reporting period not only utilizes the existing 3GPP standard's flexibility in choosing the CQI reporting period of a UE, but also allows full utilization of the benefits provided by AMC. The UE speed-specific CQI reporting period, in turn, improves the uplink capacity by adaptively controlling a UE's CQI-related uplink transmissions, without compromising on the capacity/throughput of downlink.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that although the invention is described primarily in the context of a cellular telephone/data network, the invention can be implemented in other forms of wireless networks as well (for example, a corporate-wide wireless data network, a satellite communication network, and the like).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "predetermined," "sub-frame", etc.) may be occasionally interchangeably used with its non-hyphenated version (e.g., "predetermined," "subframe,' etc.). Such occasional interchangeable uses shall not be considered inconsistent with each other.

It is noted at the outset that the terms "coupled," "connected", "connecting," "electrically connected," etc., are used interchangeably herein to generally refer to the condition of being electrically connected. Similarly, a first entity is considered to be in "communication" with a second entity (or entities) when the first entity electrically sends and/or receives (whether through wireline or wireless means) information signals (whether containing voice information or non-voice data/control information) to the second entity regardless of the type (analog or digital) of those signals. It is further noted that various figures (including component diagrams) shown and discussed herein are for illustrative purpose only, and are not drawn to scale.

Figure 1:
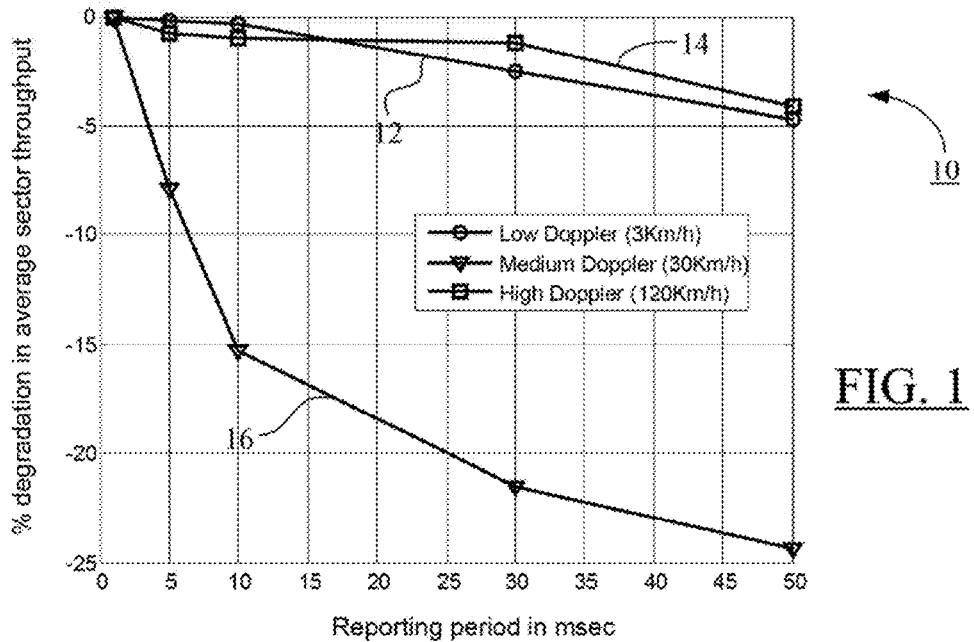
FIG. 1 shows a simulated plot depicting the impact of CQI reporting delay on LTE downlink throughput performance for frequency selective scheduling.

FIG. 1 shows a simulated plot 10 depicting the impact of CQI reporting delay on LTE downlink throughput performance for frequency selective scheduling. In the simulations 12, 14, 16 depicted in plot 10, the Single Input Multiple Output (SIMO) antenna configuration for the base station is assumed with frequency selective scheduling, which is common to Orthogonal Frequency Division Multiple Access (OFDMA) based systems such as the LTE. As is known, in frequency selective scheduling, a UE may specify to the base station up to three operating frequency bands, and the base station may schedule the UE on one of those UE-specified bands. In FIG. 1, the percentage degradation in average sector throughput is plotted against different CQI reporting periods in msec. In an LTE network, a cell may have three sectors, each with its own base station, scheduler, etc. Thus, the term "average sector throughput" may refer to an average of UE-specific downlink (DL) throughputs (e.g., per frame or per sub-frame, and may be measured in bits/frame or bits/sub-frame) for all UEs operating in an LTE cell sector. FIG. 1 depicts the results of simulation for three different UE speeds (or, more precisely, Doppler frequencies)—the graph 12 relates to UEs having a "low" Doppler frequency or speed of 3 km/h (kilometer per hour), the graph 14 relates to UEs having a "high" Doppler frequency of 120 km/h, and the graph 16 relates to UEs operating at a "medium" speed of 30 km/h.

As mentioned earlier, the wireless transmission channels are dynamically changed due to relative motion between a transmitter (e.g., a UE) and a receiver (e.g., a base station)—also known as the "Doppler effect." This increases the uncertainty of the signal quality received at the base station. The time-varying features of a radio channel between a UE and a base station may cause a frequency offset at the base station to thereby increase the bit error rate (BER) of the base station. Thus, the relative speed or Doppler frequency of a UE (relative to the base station) can directly influence the performance of a mobile communication system. For example, in case of an OFDMA-based system such as the LTE, the UE's motion speed at the receiver (i.e., the base station) can affect the synchronous and time-varying channel estimations at the receiver, which, in turn, may affect the downlink throughput. Thus, it can be seen from the graphs in FIG. 1 that as CQI reporting period increases, there is a penalty in the average sector throughput. The impact for low Doppler frequency UEs (graph 12) and for high Doppler frequency UEs (graph 14) is below 5% even when the CQI reporting period of such UEs is increased up to 50 msec. This is because for slow speed UEs, the channel changes slowly and, hence, even for 50 ms, the probability that the CQI reported by the UE is good for 50 ms remains high. For high speed UEs, the channel changes so fast that the performance loss is almost the same for different CQI reporting periods.

However, it is seen from the graph 16 in FIG. 1 that the percentage loss in average sector throughput (downlink) is severe for medium Doppler frequency UEs. This is because for low CQI reporting periods (e.g., 5 or 10 ms), the CQI reported by the UE may remain valid, but as the CQI reporting period increases, the channel condition may become outdated by the time CQI is reported to the base station and, hence, the penalty may be severe (i.e., the probability that the reported CQI is good will decrease drastically).

Figure 2:
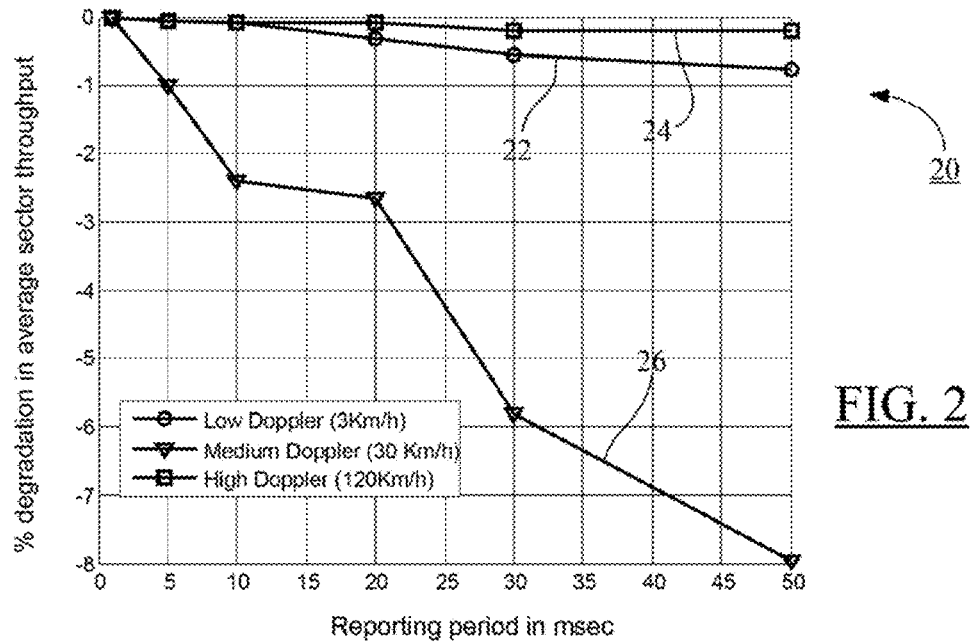
FIG. 2 shows a simulated plot depicting the impact of CQI reporting delay on LTE downlink throughput performance for wideband scheduling.

FIG. 2 shows a simulated plot 20 depicting the impact of CQI reporting delay on LTE downlink throughput performance for wideband scheduling. As in case of FIG. 1, in the simulations 22, 24, 26 depicted in plot 20, the SIMO antenna configuration for the base station is assumed, but with wideband scheduling. In contrast to frequency selective scheduling (in FIG. 1), in wideband scheduling, a UE may simply specify the required bandwidth to the base station. The base station can then select appropriate operating bands for the UE, and may schedule the UE on one of those bands. In FIG. 2 (as in FIG. 1), the percentage degradation in average sector throughput is plotted against different CQI reporting periods in msec. FIG. 2 also depicts the results of simulation for three different UE speeds—the graph 22 relates to UEs having a "low" Doppler frequency or speed of 3 km/h, the graph 24 relates to UEs having a "high" Doppler frequency of 120 km/h, and the graph 26 relates to UEs operating at a "medium" speed of 30 km/h. Similar to the frequency selective scheduling case in FIG. 1, in the wideband scheduling case in FIG. 2 also there is a penalty in the average sector throughput (downlink) as CQI reporting period increases. However, it is observed that in the wideband scheduling case in FIG. 2, the penalties are less severe for all Doppler frequencies—i.e., the maximum percentage degradation at the highest CQI reporting period of 50 ms is only approximately 8% (for medium Doppler frequency UEs in graph 26) in FIG. 2, whereas it is close to approximately 25% (for medium speed UEs in graph 16) in FIG. 1. The loss can be less severe in case of wideband scheduling because of a base station's control over assignments of operating bands (e.g., a base station can prevent re-assignment of a loss-causing band) and ability to average out performance over various operating bands more frequently (e.g., through selective assignments and re-assignments of operating bands).

Thus, it is seen from the plots 10, 20 in FIGS. 1 and 2, respectively, that higher CQI reporting periods may have more negative effect on download throughput when a UE's Doppler frequency or speed is in the medium range of speeds (30 to 40 kmph). Hence, a fixed value of CQI reporting period for all UE speeds—fast, slow, medium, etc.—may not be the best solution when effect on download throughput is considered. Therefore, the present invention provides a UE speed-based variable CQI reporting period configuration methodology, as discussed in more detail hereinbelow with reference to FIGS. 4-6. More generally speaking, the present invention provides a smaller value of CQI reporting period for medium Doppler frequency UEs and a higher value of CQI reporting period for UEs having low or high Doppler frequencies.

It is noted that, in the discussion herein, the terms "Doppler frequency" and "speed" are sometimes used interchangeably just for the sake of convenience and ease of explanation to refer to a UE's motion relative to a base station. It is understood that such interchangeable use may be technically less accurate because the Doppler frequency of a mobile device is generally represented as a ratio of the speed of the mobile device to the carrier wavelength. In other words, the term "speed" may primarily represent an absolute value (or measurement) of motion, whereas the term "Doppler frequency" may primarily denote a relative measurement of motion between two objects (here the UE and the base station). However, in the present discussion, such interchangeable use is implemented selectively for ease of explanation, as can be evident from the context of discussion.

Figure 3:
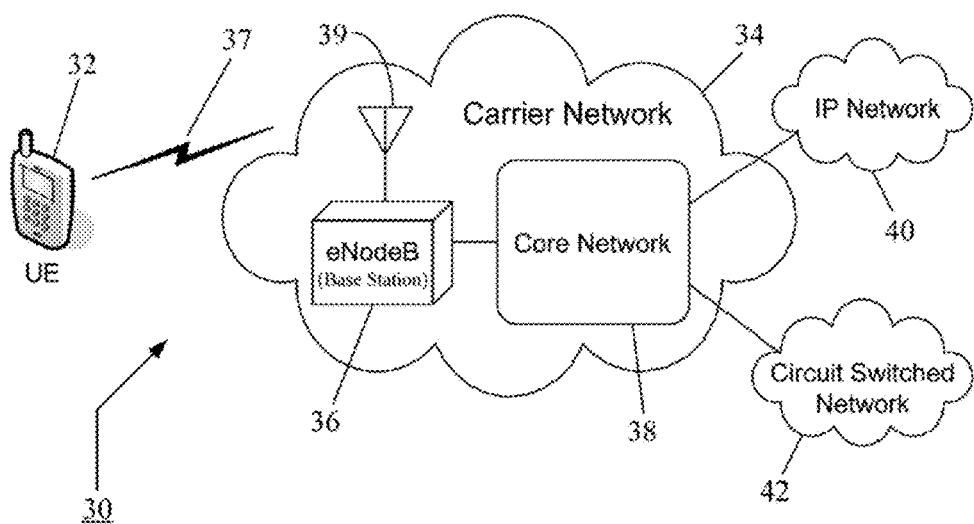
FIG. 3 is a diagram of an exemplary wireless system in which variable CQI reporting period configuration methodology according to the teachings of one embodiment of the present invention may be implemented.

FIG. 3 is a diagram of an exemplary wireless system 30 in which the variable CQI reporting period configuration methodology according to the teachings of one embodiment of the present invention may be implemented. The system 30 may include a mobile handset 32 that is in wireless communication with a carrier network 34 of a wireless service provider (or operator) through a communication node 36 of the carrier network 34. The communication node 36 may be, for example, a base station in a 3G network, or an evolved Node-B (eNodeB) or Home eNodeB (HeNB) when the carrier network is a Long-Term Evolution (LTE) network, or any other home base station or femtocell, and may provide radio interface to the mobile handset 32. In other embodiments, the communication node 36 may also include a site controller, an access point (AP), or any other type of radio interface device capable of operating in a wireless environment. It is noted here that the terms "mobile handset," "wireless handset," "terminal," and "user equipment (UE)" may be used interchangeably herein to refer to a wireless communication device that is capable of voice and/or data communication via a wireless carrier network. Some examples of such mobile handsets include cellular telephones or data transfer equipments (e.g., a Personal Digital Assistant (PDA) or a pager), smartphones (e.g., iPhone™, Android™, Blackberry™, etc.), computers, Bluetooth® devices, or any other type of user devices capable of operating in a wireless environment. Similarly, the terms "wireless network" or "carrier network" may be used interchangeably herein to refer to a wireless communication network (e.g., a cellular network) facilitating voice and/or data communication between two user equipments (UEs).

In addition to providing air interface (e.g., as represented by a wireless link 37 in FIG. 3) to the UE 32 via an antenna 39, the communication node 36 may also perform radio resource management (as, for example, in case of an eNodeB or HeNB in an LTE system) using, for example, the CQI reports received from the UEs 32 operating in the network 34. In case of a 3G carrier network 34, the communication node 36 may include functionalities of a 3G base station along with some or all functionalities of a 3G Radio Network Controller (RNC) to configure variable CQI reporting periods as discussed in more detail hereinbelow. Communication nodes in other types of carrier networks (e.g., 4G networks and beyond) also may be configured similarly. In one embodiment, the node 36 may be configured (in hardware, via software, or both) to implement the variable CQI reporting period methodology as discussed herein. For example, when existing hardware architecture of the communication node 36 cannot be modified, the variable CQI reporting period methodology according to one embodiment of the present invention may be implemented through suitable programming of one or more processors (e.g., processor 80 (or, more particularly, processing unit 84) in FIG. 8) in the communication node 36. The execution of the program code (by a processor in the node 36) may cause the processor to configure a variable CQI reporting period based on the UE's 32 speed as discussed herein. Thus, in the discussion below, although the communication node 36 may be referred to as "performing," "accomplishing," or "carrying out" a function or process, it is evident to one skilled in the art that such performance may be technically accomplished in hardware and/or software as desired. Similarly, the UE 32 may be suitably configured (in hardware and/or software) to receive the latest determination of CQI reporting period from the eNB 36 and provide CQI reports to the eNB 36 as per the reporting period specified in that determination.

The carrier network 34 may include a core network 38 coupled to the communication node 36 and providing logical and control functions (e.g., subscriber account management, billing, subscriber mobility management, etc.) in the network 34. In case of an LTE carrier network, the core network 38 may be an Access Gateway (AGW). Regardless of the type of carrier network 34, the core network 38 may function to provide connection of the UE 32 to other mobile handsets operating in the carrier network 34 and also to other communication devices (e.g., wireline or wireless phones) or resources (e.g., an Internet website) in other voice and/or data networks external to the carrier network 34. In that regard, the core network 38 may be coupled to a packet-switched network 40 (e.g., an Internet Protocol (IP) network such as the Internet) as well as a circuit-switched network 42 such as the Public-Switched Telephone Network (PSTN) to accomplish the desired connections beyond the devices operating in the carrier network 34. Thus, through the communication node's 36 connection to the core network 38 and the handset's 32 radio link with the communication node 36, a user of the handset 32 may wirelessly (and seamlessly) access many different resources or systems beyond those operating within the carrier network 34 of an operator.

As is understood, the carrier network 54 may be a cellular telephone network or a Public Land Mobile Network (PLMN) in which the UE 32 may be a subscriber unit. However, as mentioned before, the present invention is operable in other non-cellular wireless networks as well (whether voice networks, data networks, or both). Furthermore, portions of the carrier network 34 may include, independently or in combination, any of the present or future wireline or wireless communication networks such as, for example, the PSTN, or a satellite-based communication link. Similarly, as also mentioned above, the carrier network 34 may be connected to the Internet via its core network's 38 connection to the IP (packet-switched) network 40 or may include a portion of the Internet as part thereof.

Figure 4:
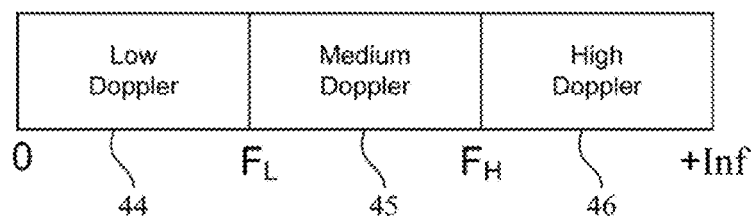
FIG. 4 shows three exemplary Doppler frequency ranges that may be used to configured CQI reporting periods according to one embodiment of the present invention.

FIG. 4 shows three exemplary Doppler frequency ranges 44-46 that may be used to configured CQI reporting periods according to one embodiment of the present invention. It is assumed here that eNB 36 is configured to "predict" or estimate the Doppler frequency of the UE 32. (Different methods to estimate a UE's Doppler frequency are outlined later hereinbelow with reference to discussion of FIG. 5.) Let "f" denote the estimated Doppler frequency of the UE 32. As shown in FIG. 4, the Doppler frequency range (or UE speed) may be divided into three categories—low Doppler frequency range 44, medium Doppler frequency range 45, and high Doppler frequency range 46. These speed ranges 44-46 may be defined using the "low" and "high" speed thresholds "$F_L$" and "$F_H$", respectively, as shown in FIG. 4. Thus, the UE 32 may be considered to be operating in the low Doppler frequency range when $0<f<F_L$, in the medium Doppler frequency range when $F_L \le f<F_H$, and in the high Doppler frequency range when $F_H \le f<+\text{Inf}$. The term "infinity" or "+Inf" is used in FIG. 4 to conveniently refer to all UE speeds that are above the threshold $F_H$. In one embodiment, $F_L=20$ km/h and $F_H=50$ km/h. In another embodiment, a UE may be considered to be in the medium Doppler frequency region 45 when its Doppler frequency is around 30 to 40 km/h. Some exemplary "low," "medium," and "high" Doppler values are provided in FIGS. 1 and 2 as well. It is noted here that the frequency (speed) thresholds $F_L$ and $F_H$ may be initially pre-computed by simulation or by field analysis (e.g., based on observation of actual speeds of UEs in the network 34), and may be later "adjusted" by considering the (downlink throughput) performance degradation (as discussed hereinbefore with reference to exemplary FIGS. 1 and 2) at various speeds within the Doppler regions 44-46 defined by these thresholds. In one embodiment, the eNB 36 may be configured to perform these threshold determinations or, in another embodiment, it can be provided with these threshold values pre-computed. In any event, the eNB 36 may use these threshold values to identify a UE's 32 Doppler frequency region and then configure an appropriate CQI reporting period of the UE 32 as discussed below.

In one embodiment, let T_Min and T_Max define two CQI reporting period values, where T_Max>T_Min. From the discussion of FIGS. 1 and 2, it is observed that for low and high Doppler frequency ranges setting a CQI reporting period to a high value does not significantly degrade the average sector throughput. Hence, according to the teachings of the present invention, the eNB 36 may fix the CQI reporting period of the UEs operating in the low and high Doppler frequency regions 44, 46 (FIG. 4) to T_Max. On the other hand, for medium Doppler frequency UEs (i.e., UEs operating in the region 45 in FIG. 4), the eNB 36 may fix the CQI reporting period to T_Min. A more detailed methodology of UE-speed based CQI reporting period determination is discussed below with reference to the flowchart in FIG. 5. However, it is noted here that the values of T_Min and T_Max depend on how much downlink throughput loss is acceptable (e.g., as discussed earlier with reference to FIGS. 1 and 2). Generally, throughput loss in the range of 5% to 10% may be tolerable (e.g., depending on whether frequency-selective or wideband scheduling is used). In that case, in one embodiment, T_Min may be 5 ms, 10 ms, or a value between 5 to 10 ms; and T_Max may be 50 ms, 100 ms, or a similar such higher value (e.g., a value between 50 to 100 ms).

Figure 5:
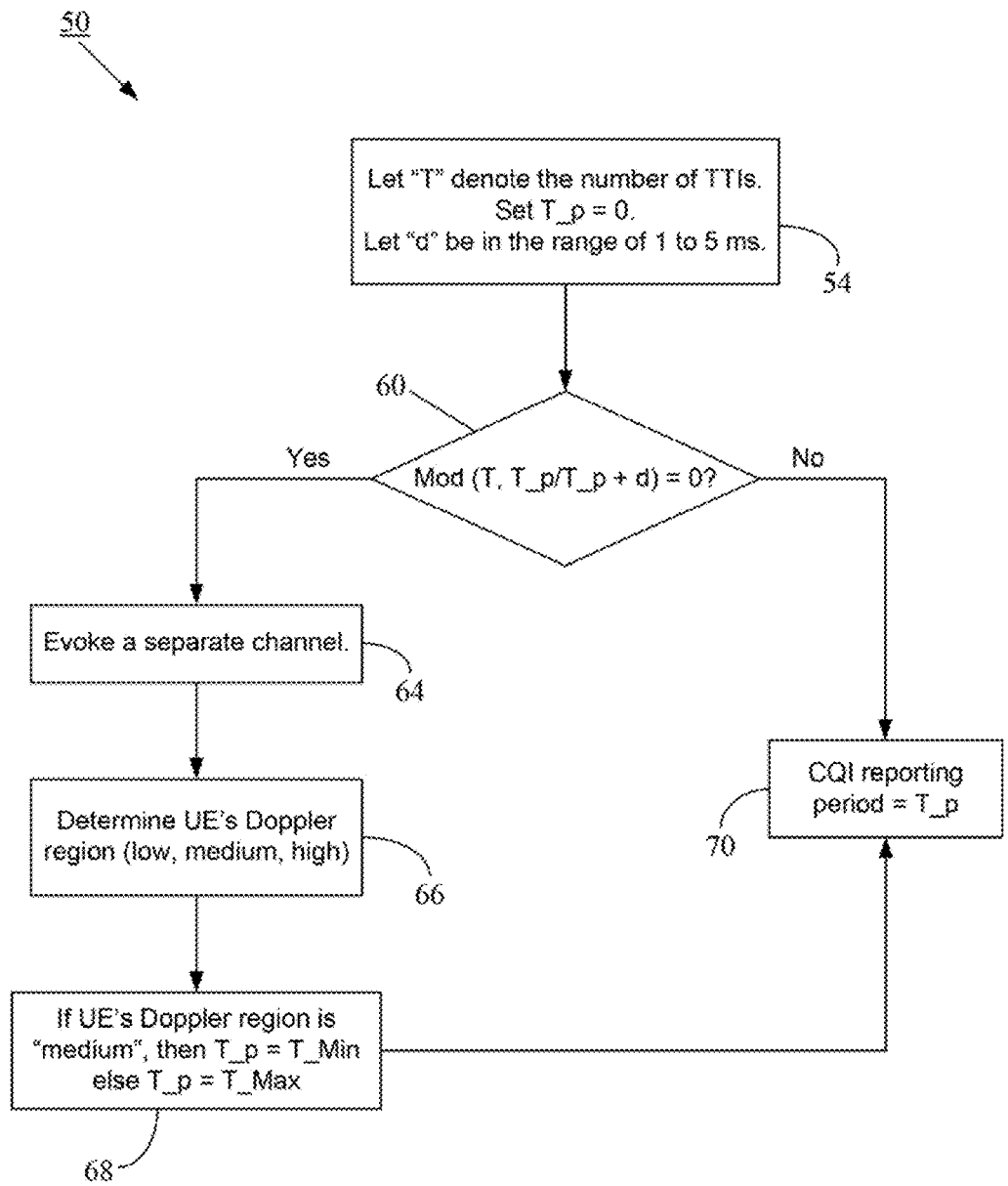
FIG. 5 depicts an exemplary flowchart according to one embodiment of the present invention to configure CQI reporting periods based on UE speeds or Doppler frequency regions.

FIG. 5 depicts an exemplary flowchart 50 according to one embodiment of the present invention to configure CQI reporting periods based on UE speeds or Doppler frequency regions. In one embodiment, the steps illustrated in FIG. 5 may be performed by the eNB 36. Initially, at block 54, let "T" denote the number of Transmit Time Interval(s) (TTI) (which are discussed below with reference to FIG. 6) in a radio frame in the uplink feedback channel (e.g., Physical Uplink Shared Channel (PUSCH) or Physical Uplink Control Channel (PUCCH) in LTE) through which the UE 32 transmits its CQI reports to the eNB 36, "T_p" denote the CQI reporting period of the UE 32 on the uplink feedback channel (e.g., PUSCH or PUCCH) through which the UE 32 is going to report its CQI, and "d" denote a small integer value in the range of 1 ms to 5 ms. It is observed here that T_p may be determined according to flowchart 50 in FIG. 5 as discussed below. However, prior to discussing additional blocks in FIG. 5, a brief discussion of FIG. 6 is provided for context.

Figure 6:
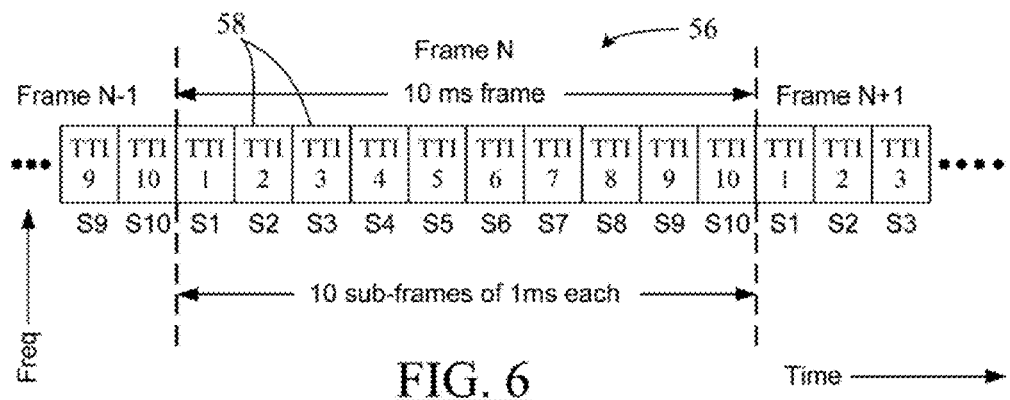
FIG. 6 illustrates an LTE radio frame in a sequence of radio frames that may constitute the communication "link" between a base station and a mobile handset in a cellular network.

FIG. 6 illustrates an LTE radio frame 56 (Frame N) in a sequence of radio frames (Frames N−1, N, N+1, etc.) that may constitute the communication "link" between a base station (e.g., the eNB 36) and a mobile handset (e.g., the UE 32) in a cellular network (e.g., the network 34). The radio frame 56 may be of a fixed duration and may be divided into a fixed number of equally-sized subframes or TTIs 58 identified as subframes "S1" through "S10" (or TTI 1 through TTI 10) in FIG. 6. For example, in case of an LTE network, each radio frame 56 (i.e., each of Frame N, Frame N+1, etc.) may be of 10 ms duration, and may contain 10 subframes or TTIs of 1 ms each as shown in FIG. 6. The frequency bandwidth of the radio frame 56 may depend on the overall system bandwidth available in the carrier network 34. Each subframe or TTI 58 contains information in the time domain as well as in the frequency domain (involving different sub-carriers). The base station 36 may transmit wireless channel resource allocation information to the mobile handset 32 via a downlink control signal, such as the Physical Downlink Control Channel (PDCCH) signal in LTE. In response, the UE 32 may send the PUSCH or PUCCH signal to the base station 36 containing terminal reports (e.g., in the form of one or more CQI bits) related to the downlink channel conditions. Such reports may be used by the base station 36 to assist it in future downlink scheduling of the mobile handset 32. In case the terminal 32 does not transmit user data at the same time as control information (e.g., CQI report), control signaling is transmitted on the PUCCH in the 3G and 4G networks. The radio resource to be used for control channel transmissions is either indicated by the downlink transmission (from the base station) or is semi-statically configured by the terminal. In case the terminal needs to simultaneously transmit uplink control information and user data, control and data are multiplexed prior to transmission and transmitted on the PUSCH.

It is observed here that reporting of CQI can be periodic on PUCCH (e.g., every 5 ms or every 10 ms), and aperiodic on PUSCH (e.g., when specified by eNB 36 through a triggering bit in PDCCH). In any event, the reporting period "T_p" for CQI (whether sent through PUCCH or PUSCH) may be determined as shown in FIG. 5 and discussed below. The number of TTIs (i.e., the parameter "T" at block 54 in FIG. 5) needed by the UE 32 to transmit its CQI reports may vary depending on the channel condition encountered by the UE 32. For example, a UE having a high Doppler frequency may need more CQI bits (e.g., over two or more TTIs) because of frequent channel changes encountered by the UE. On the other hand, a UE at low speed may use just one TTI to transmit its CQI report (using fewer CQI bits).

Referring again to FIG. 5, initially at block 54, eNB 36 may set T_p=0. Then, at block 60, eNB 36 may evaluate whether $$\text{Mod}\left(T, \frac{T\_p}{T\_p+d}\right) = 0$$

(using one or more of the integer values of "d" as part of this determination). It is noted here that the "Mod(x, y)" function determines the remainder of the division (x/y), and may be alternatively expressed as Mod(x, y)=x−(y*int (x/y)), wherein "int (x/y)" provides an integer value of the division (x/y). Thus, a Mod (x, y) function can be zero when "x" is an integer multiple of "y." Hence, the $$\text{Mod}\left(T, \frac{T\_p}{T\_p+d}\right)$$

function can be zero when "T*(T_p+d)" is an integer multiple of "T_p", which can occur, for example, when T=3 (indicating that UE transmits its CQI reports using three TTIs in an uplink radio frame—e.g., a radio frame in PUCCH or PUSCH), T_p=9 ms, and d=3 ms. As another example, the $$\text{Mod}\left(T, \frac{T\_p}{T\_p+d}\right)$$

function can be zero when T=1, T_p=4 ms, and d=4 ms. Of course these are exemplary values only, given for illustration purpose. In practice, the eNB 36 may evaluate the $$\text{Mod}\left(T, \frac{T\_p}{T\_p+d}\right)$$

function with the values of "T" and "T_p" associated with the UE 32, using different integer values of "d" (from 1 ms to 5 ms) to determine whether any of those values of "d" results in the $$\text{Mod}\left(T, \frac{T\_p}{T\_p+d}\right)$$

function being equal to zero.

If the determination at block 60 is in the negative (i.e., $$\text{Mod}\left(T, \frac{T\_p}{T\_p+d}\right) \neq 0),$$

then eNB 36 may assign the CQI reporting period equal to "T_p" to the UE 32 as indicated at block 70. However, if the determination at block 60 is in the affirmative, the eNB 36 may evoke a separate channel (block 64) to carry out measurements (discussed below) to determine UE's 32 Doppler region (block 66). In LTE, this separate channel may be PUCCH if the UE's CQI reporting is done on PUSCH, and vice versa. From the signals received from the UE 32 on the separate channel, the eNB 36 may determine the UE's Doppler frequency region (block 66) in accordance with the Doppler regions identified in FIG. 4. Thus, at block 66, eNB 36 may determine whether UE's speed falls under the "low" Doppler region 44, the "medium" Doppler region 45, or the "high" Doppler region 46. If UE's 32 Doppler frequency region is "medium", then the eNB 36 may set UE's 32 CQI reporting period T_p=T_Min, as indicated at blocks 68 and 70. However, if UE's 32 Doppler frequency region is "low" or "high", then the eNB 36 may set T_p=T_Max, as also indicated at blocks 68 and 70. The eNB 36 may then send the configured value of T_p (i.e., the CQI reporting period of the UE 32) to the UE 32 (e.g., via PDCCH) so as to instruct the UE 32 to use the eNB-determined value of CQI reporting period while sending its CQI reports to the eNB 36.

In one embodiment, the eNB 36 may repeat the steps outlined at blocks 60, 64, 66, 68, and 70 in FIG. 5 at a predetermined time interval (e.g., every 10 seconds) so as to "revise" its determination of T_p, if needed (e.g., in view of any variations in UE's 32 Doppler frequency or speed over time). The eNB 36 may then convey this "revised" value of T_p to the UE 32 to be used for future CQI transmissions from the UE 32, until a different value of T_p is provided again to the UE 32 by the eNB 36. It is understood that although the discussion of FIG. 5 herein is provided in the context of the single UE 32 for illustration, the eNB 36 may perform the methodology outlined in the flowchart 50 in FIG. 5 for each UE in the carrier network 34 so as to configure a UE-specific CQI reporting period based on the UE's speed (or Doppler frequency region). It is noted, however, that if the eNB 36 somehow already "knows" or has already estimated a UE's Doppler frequency or speed prior to carrying out the methodology in FIG. 5, then the eNB 36 may not need to perform the steps outlined at blocks 54, 60, 64, and 66 in FIG. 5. Rather, in this case, the eNB 36 may directly perform the steps 68, 70 and assign the appropriate value (T_Max or T_Min) to UE-specific T_p based on the already "known" or estimated UE speed.

The eNB 36 may determine or estimate the UE's 32 Doppler frequency region (at block 66 in FIG. 5) using a number of different methods outlined below. Because speed of a mobile device in a communications network may directly relate to the rate of wireless mobile channel variations, knowledge of a mobile device's speed may allow improvement of system performance (e.g., more accurate channel prediction, adaptive and fast link adaptation, power control, etc.) in a multi-cell wireless communication system. A mobile device's speed reflects the rate of wireless mobile channel variations and, hence, is directly proportional to the mobile device's Doppler frequency (which represents such channel variations based on the relative speed between the mobile device and a base station). Speed estimation, or equivalently, Doppler frequency estimation, may be done based on signals received at the mobile unit and/or at a base station or other fixed station of a mobile communication network.

In one embodiment, the eNB 36 may estimate the Doppler frequency region of the UE 32 (at block 66 in FIG. 5) based on certain parameters obtained from, for example, uplink pilot or Sounding Reference Signal (SRS) transmitted from the UE 32 over the separate channel (evoked by the eNB 36 at block 64 in FIG. 5 as discussed before). These parameters include, for example, UE's frequency locations (in case of frequency-selective scheduling), CQI, or Precoding Matrix Information (PMI), as discussed below. Although measurements based on these three parameters are discussed in detail below, it is understood that the methodology discussed herein works for any other parameters that can be similarly measured. Also, methods other than those discussed below may be used to estimate a UE's Doppler frequency. Examples of such other methods are provided in U.S. Pat. No. 7,801,084; U.S. Patent Application Publication No. US 2008/0211719; and U.S. Patent Application Publication No. US 2010/0303177.

In the first method, the eNB 36 may determine the UE's 32 Doppler frequency region (at block 66 in FIG. 5) based on the rate of change of UE's frequency location observed at the eNB 36 over two (2) successive TTIs (which could be consecutive TTIs over 2 ms or two TTIs separated by an eNB-determined time interval—e.g., 5 ms), preferably in a single radio frame in the separate channel (evoked by eNB 36 at block 64 in FIG. 5 as discussed before). As mentioned before, in frequency selective scheduling, a UE may specify to the base station up to three (3) operating frequency bands. Let "$\Delta f/\Delta t$" denote the rate of change of UE's frequency location—i.e., how rapidly UE switches operating frequency bands. If $\Delta f/\Delta t = F\_1$, then the UE 32 may be considered to be operating in the low Doppler frequency region 44 (FIG. 4). In one embodiment, $F\_1=0$, indicating that there is no rate of change in UE's frequency location over the measurement interval of 2 TTIs. If $F\_1 < \Delta f/\Delta t < F\_2$, then the UE 32 may be considered to be operating in the medium Doppler frequency region 45 (FIG. 4). In one embodiment, $F\_2=3$ (representing the maximum number of frequency bands a UE can specify at a time to the eNB in frequency-selective scheduling). Finally, if $\Delta f/\Delta t \geq F\_2$, then the UE 32 may be considered to be operating in the high Doppler frequency region 46 (FIG. 4). Other suitable values for $F\_1$ and $F\_2$ may be selected as well either through simulations or field analysis.

In the second method, the eNB 36 may determine the UE's 32 Doppler frequency region (at block 66 in FIG. 5) based on the rate of change in the length (indicated by number of transmission bits) of CQI sent by the UE 32 over two (2) successive TTIs (which could be consecutive TTIs over 2 ms or two TTIs separated by an eNB-determined time interval—e.g., 5 ms), preferably in a single radio frame in the separate channel (evoked by eNB 36 at block 64 in FIG. 5 as discussed before). In LTE, a UE may use up to 16 transmission bits to send its CQI report to the base station. In fast-changing channel conditions (e.g., when the UE is moving at high speed), the number of CQI bits used by the UE to send its CQI report may be higher than in steady or slower-changing channels. Let "$\Delta CQI/\Delta t$" denote the rate of change in UE's CQI bits. If $\Delta CQI/\Delta t < C\_1$, then the UE 32 may be considered to be operating in the low Doppler frequency region 44 (FIG. 4). In one embodiment, $C\_1$ may have a value between 4 to 6 bits, indicating that there is no significant rate of change in UE's CQI report length over the measurement interval of 2 TTIs. If $C\_1 \leq \Delta CQI/\Delta t < C\_2$, then the UE 32 may be considered to be operating in the medium Doppler frequency region 45 (FIG. 4). In one embodiment, $C\_2$ may have a value between 10 to 12 bits. Finally, if $\Delta CQI/\Delta t \geq C\_2$, then the UE 32 may be considered to be operating in the high Doppler frequency region 46 (FIG. 4). Other suitable values for $C\_1$ and $C\_2$ may be selected as well either through simulations or field analysis.

In the third method, the eNB 36 may determine the UE's 32 Doppler frequency region (at block 66 in FIG. 5) based on the rate of change in the length (indicated by number of transmission bits) of PMI sent by the UE 32 over two (2) successive TTIs (which could be consecutive TTIs over 2 ms or two TTIs separated by an eNB-determined time interval—e.g., 5 ms), preferably in a single radio frame in the separate channel (evoked by eNB 36 at block 64 in FIG. 5 as discussed before). In a 2×2 Multiple Input Multiple Output (MIMO) antenna configuration (of the eNB 36) in LTE, up to six (6) bits may be allocated (by the eNB 36) for PMI transmission by the UE 32. As is known, the PMI from a UE may indicate the preferred precoding matrix for Physical Downlink Shared Channel (PDSCH) or PDCCH from the base station. In fast-changing channel conditions (e.g., when the UE is moving at high speed), the number of PMI bits may be higher than in steady or slower-changing channels. Let "$\Delta PMI/\Delta t$" denote the rate of change in UE's PMI bits. If $\Delta PMI/\Delta t < P\_1$, then the UE 32 may be considered to be operating in the low Doppler frequency region 44 (FIG. 4). In one embodiment, $P\_1$ may have a value of 1 or 2 bits, indicating that there is no significant rate of change in UE's PMI transmission over the measurement interval of 2 TTIs. If $P\_1 \leq \Delta PMI/\Delta t < P\_2$, then the UE 32 may be considered to be operating in the medium Doppler frequency region 45 (FIG. 4). In one embodiment, $P\_2$ may have a value of 4 or 5 bits. Finally, if $\Delta PMI/\Delta t \geq P\_2$, then the UE 32 may be considered to be operating in the high Doppler frequency region 46 (FIG. 4). Other suitable values for $P\_1$ and $P\_2$ may be selected as well either through simulations or field analysis.

It is observed from the above discussion that each Doppler frequency region determination threshold pair—$F\_1$ and $F\_2$, $C\_1$ and $C\_2$, and $P\_1$ and $P\_2$—may be considered as representative of the corresponding threshold pair—$F_L$ and $F_H$—shown in FIG. 4. Hence, UE's Doppler region determination at block 66 in FIG. 5 may directly relate to the UE's Doppler frequency (or speed) ranges discussed earlier with reference to FIG. 4.

Figure 7:
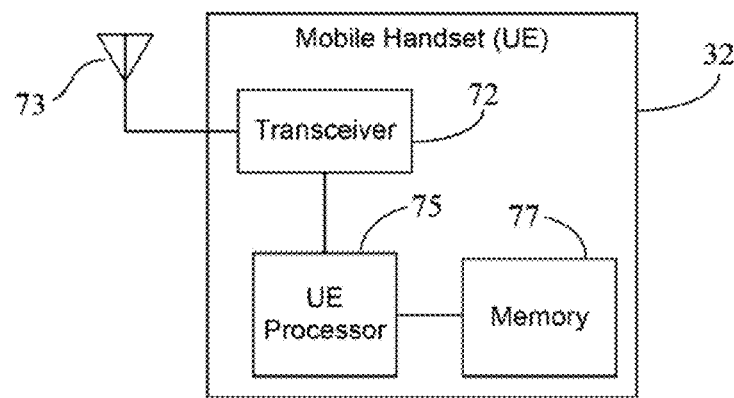
FIG. 7 is a block diagram of an exemplary mobile handset or UE according to one embodiment of the present invention.

FIG. 7 is a block diagram of an exemplary mobile handset or UE 32 according to one embodiment of the present invention. The UE 32 may include a transceiver 72, an antenna 73, a processor 75, and a memory 77 (which may, in some embodiments, also include memory on UE's Subscriber Identity Module (SIM) card). In particular embodiments, some or all of the functionalities described above (e.g., reception of T_p (value of CQI reporting period) via PDCCH or PDSCH signals from the eNB 36 using the antenna 73 and transceiver 72; storage of the value of T_p in the memory 77; transmission of CQI/PMI reports, etc., via PUCCH or PUSCH to eNB 36 using transceiver 72 and antenna 73; etc.) as being provided by mobile communication devices or other forms of UE may be provided by the UE processor 75 executing instructions stored on a computer-readable medium, such as the memory 77 shown in FIG. 7. Alternative embodiments of the UE 32 may include additional components beyond those shown in FIG. 7 that may be responsible for enabling the UE's 32 communication with the base station 36 in the network 34 and for providing certain aspects of the UE's functionality, including any of the functionality described above and/or any functionality necessary to support the solution described above.

Figure 8:
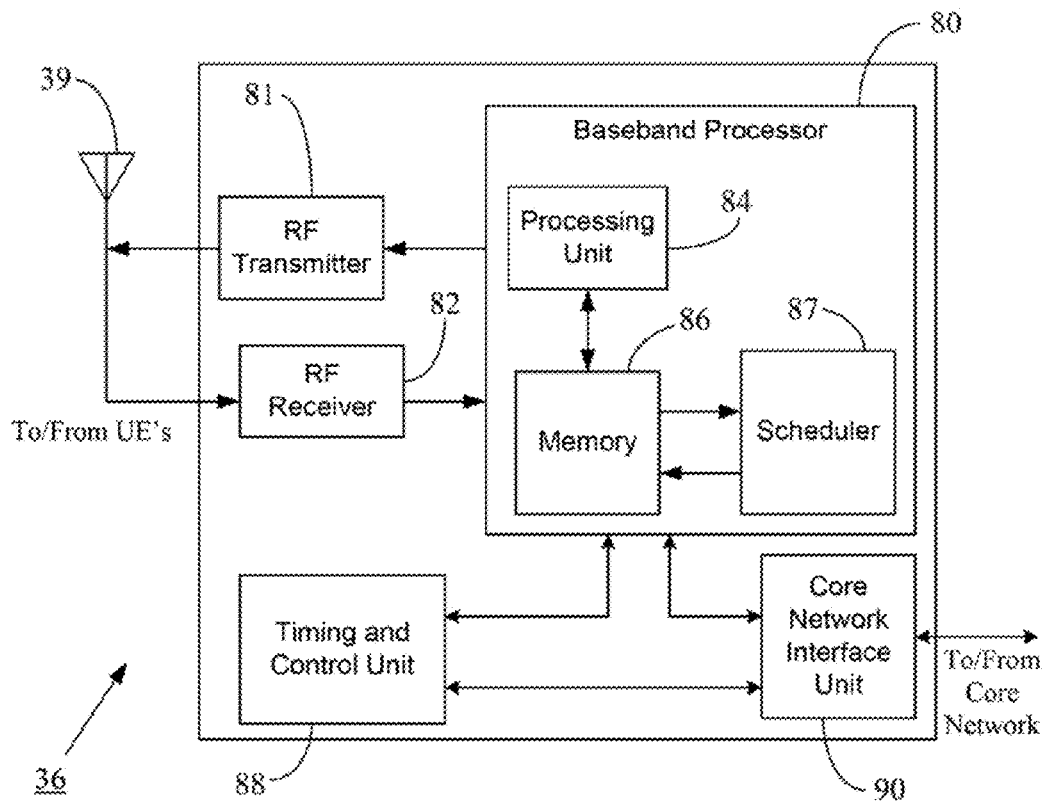
FIG. 8 is a block diagram of an exemplary eNB or a similar mobile communication node (or base station) according to one embodiment of the present invention.

FIG. 8 is a block diagram of an exemplary eNB or a similar mobile communication node (or base station) 36 according to one embodiment of the present invention. The eNB 36 may include a baseband processor 80 to provide radio interface with the mobile handsets (in the carrier network 34) via eNB's Radio Frequency (RF) transmitter 81 and RF receiver 82 units coupled to the eNB antenna 39. The processor 80 may be configured (in hardware and/or software) to provide to the UE 32 a value (T_p) of the CQI reporting period of the UE 32 as per the teachings of the present invention. In one embodiment, the processor 80 may determine the UE's 32 Doppler frequency region (as discussed hereinbefore) using transmissions received from the UE 32 (e.g., PUCCH or PUSCH) via the receiver 82, whereas eNB's transmissions to the UE 32 may be carried out via the transmitter 81. The baseband processor 80 may include a processing unit 84 in communication with a memory 86 to process and store relevant information for the cell. A scheduler (e.g., the scheduler 87 in FIG. 8) in the eNB 36 may provide the scheduling decision for UE 32 based on a number of factors such as, for example, QoS (Quality of Service) parameters, UE buffer status, uplink channel quality (CQI) report received from UE 32, UE capabilities, etc. The scheduler 87 may have the same data structure as a typical scheduler in an eNB in an LTE system.

The processor 80 may also provide additional baseband signal processing (e.g., mobile device registration, channel signal information transmission, radio resource management, etc.) as required. The processing unit 84 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above as being provided by a mobile base station, a base station controller, a node B, an enhanced node B, an HeNB, a home base station, a femtocell base station, and/or any other type of mobile communications node may be provided by the processing unit 84 executing instructions stored on a computer-readable data storage medium, such as the memory 86 shown in FIG. 8.

The eNB 36 may further include a timing and control unit 88 and a core network interface unit 90 as illustrated in FIG. 8. The control unit 88 may monitor operations of the processor 80 and the network interface unit 90, and may provide appropriate timing and control signals to these units. The interface unit 90 may provide a bi-directional interface for the eNB 36 to communicate with the core network 38 to facilitate administrative and call-management functions for mobile subscribers operating in the carrier network 34 through eNB 36.

Alternative embodiments of the base station 36 may include additional components responsible for providing additional functionality, including any of the functionality identified above and/or any functionality necessary to support the solution described above. Although features and elements are described above in particular combinations, each feature or element can be used alone without the other features and elements or in various combinations with or without other features and elements. The methodology provided herein (related to configuration of a UE's CQI reporting period based on the UE's speed) may be implemented in a computer program, software, or firmware incorporated in a computer-readable storage medium (e.g., the memory 86 in FIG. 8) for execution by a general purpose computer or a processor (e.g., the processing unit 84 in FIG. 8). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs).

The foregoing describes a system and method for configuring a variable CQI reporting period based on a UE's Doppler frequency or speed. Mobile users are divided into three categories based on their speed—for example, low, medium, and high Doppler users—and are assigned the CQI reporting periods accordingly by the base station. The users in the low and high Doppler regions (i.e., UEs with low and high speeds) receive a high value for the CQI reporting period, whereas the users in the medium Doppler region (i.e., UEs with medium speeds) receive a low value for the CQI reporting period. In case of LTE, this approach to variable CQI reporting period not only utilizes the existing 3GPP standard's flexibility in choosing the CQI reporting period of a UE, but also allows full utilization of the benefits provided by Adaptive Modulation and Coding (AMC). The UE speed-specific CQI reporting period, in turn, improves the uplink capacity by adaptively controlling a UE's CQI-related uplink transmissions, without compromising on the downlink capacity/throughput.

It is noted here that the teachings of the present invention related to configuration of a mobile unit's CQI reporting period based on that mobile unit's speed may be applied, with suitable modifications (as may be apparent to one skilled in the art using the present teachings), to a number of different wireless systems or networks, such as, for example, networks/systems using 3G/4G specifications. Some examples of such systems or networks include, but not limited to, Global System for Mobile communications (GSM) networks, LTE networks, LTE-Advanced networks, UTRAN/E-UTRAN networks, Wideband Code Division Multiple Access (WCDMA) systems, WCDMA-based HSPA systems, CDMA2000 systems, GSM/Enhanced Data Rate for GSM Evolution (GSM/EDGE) systems, EV-DO systems, and WiMAX systems.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of determining a Channel Quality Information (CQI) reporting period of a User Equipment (UE) that is in wireless communication with a processor via a wireless network associated therewith, the method comprising the steps of:

using the processor, determining a Doppler frequency region of the UE, wherein the Doppler frequency region of the UE includes one of the following:
a low Doppler frequency region when the speed of the UE is below a first predetermined threshold,
a high Doppler frequency region when the speed of the UE is at or above a second predetermined threshold, and
a medium Doppler frequency region when the speed of the UE is at or above the first predetermined threshold, but below the second predetermined threshold; and using the processor, configuring the CQI reporting period of the UE based on the determination of the Doppler frequency region of the UE, wherein the CQI reporting period is configured to one of the following values:
- a first predetermined value when the Doppler frequency region of the UE is either the low Doppler frequency region or the high Doppler frequency region, and
- a second predetermined value when the Doppler frequency region of the UE is the medium Doppler frequency region, wherein the second predetermined value is lower than the first predetermined value.

2. The method of claim 1, wherein the first predetermined value is in the range of 50 ms to 100 ms, and wherein the second predetermined value is in the range of 5 ms to 10 ms.

3. The method of claim 1, wherein determining the Doppler frequency region of the UE includes at least one of the following:
- determining the Doppler frequency region of the UE based on a rate of change of the UE's uplink transmission frequency location over two successive Transmit Time Intervals (TTIs);
- determining the Doppler frequency region of the UE based on a rate of change of the CQI reported to the processor by the UE over two successive TTIs; and
- determining the Doppler frequency region of the UE based on a range of change of a Precoding Matrix Information (PMI) reported to the processor by the UE over two successive TTIs.

4. The method of claim 3, wherein the Doppler frequency region determined based on the rate of change of the UE's uplink transmission frequency location includes one of the following:
- the low Doppler frequency region when the rate of change of the UE's uplink transmission frequency location is below a third predetermined threshold, wherein the third predetermined threshold is representative of the first predetermined threshold;
- the high Doppler frequency region when the rate of change of the UE's uplink transmission frequency location is above a fourth predetermined threshold, wherein the fourth predetermined threshold is representative of the second predetermined threshold; and
- the medium Doppler frequency region when the rate of change of the UE's uplink transmission frequency location is between the third and the fourth predetermined thresholds.

5. The method of claim 3, wherein the Doppler frequency region determined based on the rate of change of the reported CQI includes one of the following:
- the low Doppler frequency region when the rate of change of the reported CQI is below a third predetermined threshold, wherein the third predetermined threshold is representative of the first predetermined threshold;
- the high Doppler frequency region when the rate of change of the reported CQI is above a fourth predetermined threshold, wherein the fourth predetermined threshold is representative of the second predetermined threshold; and
- the medium Doppler frequency region when the rate of change of the reported CQI is between the third and the fourth predetermined thresholds.

6. The method of claim 3, wherein the Doppler frequency region determined based on the rate of change of the reported PMI includes one of the following:
- the low Doppler frequency region when the rate of change of the reported PMI below a third predetermined threshold, wherein the third predetermined threshold is representative of the first predetermined threshold;
- the high Doppler frequency region when the rate of change of the reported PMI is above a fourth predetermined threshold, wherein the fourth predetermined threshold is representative of the second predetermined threshold; and
- the medium Doppler frequency region when the rate of change of the reported PMI is between the third and the fourth predetermined thresholds.

7. The method of claim 3, wherein the two successive TTIs belong to a single uplink radio frame.

8. The method of claim 1, further comprising:
using the processor, instructing the UE to use the CQI reporting period configured by the processor.

9. The method of claim 1, further comprising:
using the processor, evoking a separate physical uplink channel prior to determining the Doppler frequency region of the UE; and
using the processor, receiving uplink communication from the UE over the separate physical uplink channel so as to determine the Doppler frequency region of the UE.

10. The method of claim 9, wherein the separate physical uplink channel is evoked when $$\mathrm{Mod}\left(T, \frac{T\_p}{T\_p + d}\right) = 0,$$

where "T" denotes the number of Transmit Time Intervals (TTIs) in an uplink radio frame that are used by the UE to report the CQI to the processor, "T_p" denotes the CQI reporting period of the UE in ms, and "d" denotes an integer value in the range of 1 ms to 5 ms.

11. The method of claim 1, further comprising:
using the processor, repeating the determining and the configuring steps after a predetermined time interval.

12. A method of setting a Channel Quality Information (CQI) reporting period of a User Equipment (UE) that is in wireless communication with a processor via a wireless network associated therewith, the method comprising the steps of:
using the processor, assigning a Doppler frequency region to the UE based on the speed of the UE estimated by the processor, wherein the Doppler frequency region of the UE includes one of the following:
- a low Doppler frequency region when the estimated speed of the UE is below a first predetermined threshold,
- a high Doppler frequency region when the estimated speed of the UE is at or above a second predetermined threshold, and
- a medium Doppler frequency region when the estimated speed of the UE is at the first predetermined threshold or between the first and the second predetermined thresholds; and
using the processor, setting the CQI reporting period of the UE based on the assigned Doppler frequency region to the UE, wherein the CQI reporting period is set to one of the following values:
- a first predetermined value when the Doppler frequency region of the UE is either the low Doppler frequency region or the high Doppler frequency region, and
- a second predetermined value when the Doppler frequency region of the UE is the medium Doppler frequency region, wherein the second predetermined value is lower than the first predetermined value.

13. A mobile communication node that is in wireless communication with a User Equipment (UE) via a wireless network associated with the UE, wherein the mobile communication node is configured to perform the following:
  determine a Doppler frequency region of the UE, wherein the Doppler frequency region of the UE includes one of the following:
    a low Doppler frequency region when the estimated Doppler frequency of the UE is below a first predetermined threshold,
    a high Doppler frequency region when the estimated Doppler frequency of the UE is at or above a second predetermined threshold, and
    a medium Doppler frequency region when the estimated Doppler frequency of the UE is at or above the first predetermined threshold, but below the second predetermined threshold; and
  set a Channel Quality Information (CQI) reporting period of the UE to one of the following values:
    a first predetermined value when the Doppler frequency region of the UE is either the low Doppler frequency region or the high Doppler frequency region, and
    a second predetermined value when the Doppler frequency region of the UE is the medium Doppler frequency region, wherein the second predetermined value is lower than the first predetermined value.

14. The mobile communication node of claim 13, further configured to perform one of the following as part of determining the Doppler frequency region of the UE:
  determine the Doppler frequency region of the UE based on a rate of change of the UE's uplink transmission frequency location over two successive Transmit Time Intervals (TTIs);
  determine the Doppler frequency region of the UE based on a rate of change of the CQI reports received from the UE over two successive TTIs; and
  determine the Doppler frequency region of the UE based on a range of change of Precoding Matrix Information (PMI) reports received from the UE over two successive TTIs.

15. The mobile communication node of claim 13, further configured to transmit to the UE the value of the CQI reporting period set thereby.

16. The mobile communication node of claim 13, further configured to perform the following:
  evoke a separate physical uplink channel prior to determining the Doppler frequency region of the UE; and
  receive uplink communication from the UE over the separate physical uplink channel so as to determine the Doppler frequency region of the UE.

17. A system comprising:
  a mobile communication node that is in wireless communication with a mobile handset via a wireless network associated with the mobile handset, wherein the mobile communication node is configured to perform the following:
    determine a Doppler frequency region of the mobile handset, wherein the Doppler frequency region of the mobile handset includes one of the following:
      a low Doppler frequency region when the speed of the mobile handset is below a first predetermined threshold,
      a high Doppler frequency region when the speed of the mobile handset is at or above a second predetermined threshold, and
      a medium Doppler frequency region when the speed of the mobile handset is at or above the first predetermined threshold, but below the second predetermined threshold,
    set a Channel Quality Information (CQI) reporting period of the mobile handset to one of the following values:
      a first predetermined value when the Doppler frequency region of the mobile handset is either the low Doppler frequency region or the high Doppler frequency region, and
      a second predetermined value when the Doppler frequency region of the mobile handset is the medium Doppler frequency region, wherein the second predetermined value is lower than the first predetermined value, and
    send the value of the CQI reporting period to the mobile handset, wherein the mobile handset is configured to use the value of the CQI reporting period received from the mobile communication node when sending a CQI report to the mobile communication node.

18. The system of claim 17, wherein the first predetermined value is in the range of 50 ms to 100 ms, and wherein the second predetermined value is in the range of 5 ms to 10 ms.

19. The system of claim 17, wherein the mobile communication node is further configured to perform the following:
  evoke a separate physical uplink channel prior to determining the Doppler frequency region of the mobile handset; and
  receive uplink communication from the mobile handset over the separate physical uplink channel so as to determine the Doppler frequency region of the mobile handset.

20. The system of claim 17, wherein the mobile communication node is further configured to repeat determination of the Doppler frequency region, setting of the CQI reporting period, and sending of the value of the CQI reporting period after a predetermined time interval.

* * * * *

UNITED STATES PATENT AND TRADEMARK OFFICE
CERTIFICATE OF CORRECTION

PATENT NO. : 8,670,343 B2
APPLICATION NO. : 13/157030
DATED : March 11, 2014
INVENTOR(S) : Nammi Page 1 of 1

It is certified that error appears in the above-identified patent and that said Letters Patent is hereby corrected as shown below:

In the Claims

In Column 17, Line 65, in Claim 6, delete "PMI" and insert -- PMI is --, therefor.

Signed and Sealed this
Eleventh Day of November, 2014

Michelle K. Lee
*Deputy Director of the United States Patent and Trademark Office*